(12) United States Patent
Sonderegger

(10) Patent No.: US 7,546,313 B1
(45) Date of Patent: Jun. 9, 2009

(54) METHOD AND FRAMEWORK FOR USING XML FILES TO MODIFY NETWORK RESOURCE CONFIGURATIONS

(75) Inventor: Kelly Sonderegger, Santaquin, UT (US)

(73) Assignee: Novell, Inc., Provo, UT (US)

( * ) Notice: Subject to any disclaimer, the term of this patent is extended or adjusted under 35 U.S.C. 154(b) by 1132 days.

(21) Appl. No.: 10/463,753

(22) Filed: Jun. 17, 2003

(51) Int. Cl.
*G06F 7/00* (2006.01)
*G06F 17/00* (2006.01)
*G06F 15/173* (2006.01)

(52) U.S. Cl. .................. 707/104.1; 707/1; 709/223
(58) Field of Classification Search ............ 707/1, 707/104.1; 709/223
See application file for complete search history.

(56) References Cited

U.S. PATENT DOCUMENTS

| | | | |
|---|---|---|---|
| 5,526,358 A * | 6/1996 | Gregerson et al. ......... 709/221 |
| 5,692,129 A | 11/1997 | Sonderegger et al. | |
| 5,761,499 A | 6/1998 | Sonderegger | |
| 5,841,972 A * | 11/1998 | Fanshier .................... 709/220 |
| 5,859,978 A | 1/1999 | Sonderegger et al. | |
| 5,893,118 A | 4/1999 | Sonderegger | |
| 6,044,461 A * | 3/2000 | Agha et al. ................ 713/1 |
| 6,105,069 A | 8/2000 | Franklin et al. | |
| 6,173,289 B1 | 1/2001 | Sonderegger et al. | |
| 6,209,124 B1 * | 3/2001 | Vermeire et al. ........... 717/114 |
| 6,259,448 B1 | 7/2001 | McNally et al. | |
| 6,336,131 B1 | 1/2002 | Wolfe | |
| 6,625,643 B1 | 9/2003 | Colby et al. | |
| 2004/0003388 A1 * | 1/2004 | Jacquemot et al. ........ 717/174 |

OTHER PUBLICATIONS

Juha Lindfors, Marc Fleury and the JBoss Group, JMX: Managing J2EE with Java Management Extensions. Chapter 8: XMBean: Model Mbean Implementation, pp. 233-246.
www.java.sun.com/reference/index.html. "Java Technology Reference" Sun Microsystems, Inc. 1994-2004, 3 pages.
"Specification for the Representation of CIM in XML" DSP0201, Version 2.1, January, Distributed Management Task Force, Inc. (DMTF). 2000-2003, 32 pages.
"Linuxconf—Linux Administration Made Easy!" www.solucorp.qc/ca/linuxconf/index.hc?frame=4, Nov. 26, 2003, 1 page.
"Web-Based Enterprise Management (WBEM) Initiative", www.dmtf.org/standards/webm 2004, 2 pages.

(Continued)

*Primary Examiner*—Apu M Mofiz
*Assistant Examiner*—Charles E Lu
(74) *Attorney, Agent, or Firm*—Haynes Boone, LLP

(57) ABSTRACT

A method and system are provided for a script driven framework that produces and uses a transactional document. The transactional document provides an interface for modifying configuration information associated with a network resource. In one example, a framework for creating the transactional document includes a transformation file for converting between file formats, multiple responders, a responders file, a mapping configuration file, and a service manager. The responders file assigns at least one responder to create a specified portion of the transactional document based on the configuration information. The mapping configuration file maps between the transactional document and a user interface, which enables the configuration information to be modified through the transactional document via the user interface. The service manager shuts down and restarts services in a predefined order so that the network resource will be configured as defined by the modified configuration information.

16 Claims, 10 Drawing Sheets

OTHER PUBLICATIONS

"CIM/WBEM Addenda" www.dmtf.org/standards/addenda 2004, 1 page.

"Welcome to SUSE Linux" www.suse.com/us/index.html, Feb. 2004, 2 pages.

"Webmin" www.webmin.com, Mar. 2004, 1 page.

"Welcome to Clark Connect" www.clarkconnect.com, Mar. 2004, 2 pages.

www.java.sun.com/reference/index.html. "Java Technology Reference" Sun Microsystems, Inc. 1994-2004, no date.

"Specification for the Representation of CIM in XML" DSP0201, Version 2.1, January, Distributed Management Task Force, Inc. (DMTF). 2000-2003.

"Linuxconf—Linux Administration Made Easy!" www.solucorp.qc.ca/linuxconf/index.hc?frame=4, Nov. 26, 2003.

"Web-Based Enterprise Management (WBEM) Initiative", www.dmtf.org/standards/wbem 2004.

"CIM/WBEM Addenda" ww.dmtf.org/standards/addenda 2004.

"Welcome to SUSE Linux" www.suse.com/us/index.html, Feb. 2004.

"Webmin" www.webmin.com, Mar. 2004.

"Welcome to Clark Connect" www.clarkconnect.com, Mar. 2004.

\* cited by examiner

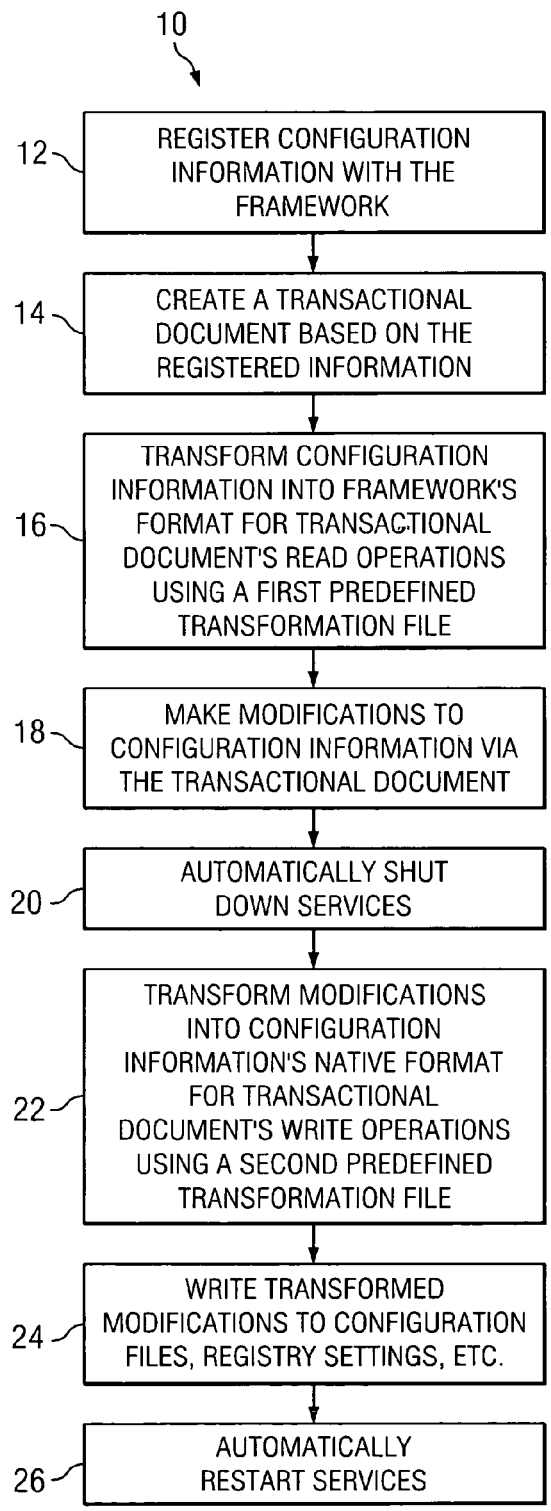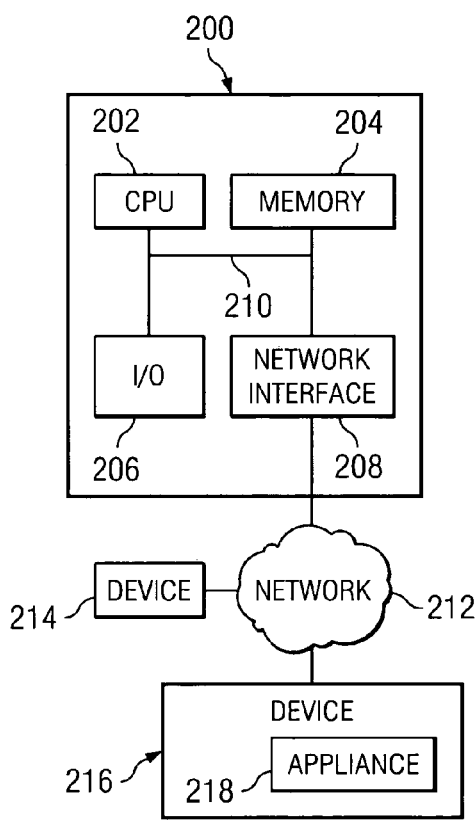
Fig. 1A
Fig. 2

```
    <ApplianceRoot>
302   <Appliance>
310     <NetworkAdapters>
312       <Subnets>
314         <Gateway>137.65.203.254</Gateway>
316         <Type>Ethernet</Type>
318         <Device>eth0</Device>
320         <Netmask>255.255.254.0</Netmask>
            <IpAddress>137.65.203.166</IpAddress>
          </Subnets>
        </NetworkAdapters>
304     <DateAndTime>
          <Date>08/05/2003</Date>
          <CurrentTimeZone>Mountain Standard Time</CurrentTimeZone>
          <Time>15:57:43</Time>
          <AvailableTimeZone>Etc/GMT+12</AvailableTimeZone>
          <AvailableTimeZone>Pacific/Kiritimati</AvailableTimeZone>
        </DateAndTime>
306     <DateAndTime2>
          <Date>Thu May 8 15:57:43 MDT</Date>
        </DateAndTime2>
308     <Files>
          <File>bin</File>
          <File>boot</File>
          <File>DateAndTime2.xml</File>
          <File>dev</File>
          <File>etc</File>
          <File>Files.xml</File>
          <File>home</File>
          <File>initrd</File>
          <File>lib</File>
          <File>lost+found</File>
          <File>misc</File>
          <File>mnt</File>
          <File>opt</File>
          <File>proc</File>
          <File>root</File>
          <File>sbin</File>
          <File>tmp</File>
          <File>usr</File>
          <File>var</File>
          <File></File>
        </Files>
      </Appliance>
    </ApplianceRoot>
```

```
<?xml version="1.0" encoding="UTF-8"?>
<RegularExpressionTransforms>
402 <SubstitutionPair expression="(TYPE=\s*)(.+)">(Type)$2(\\Type)</SubstitutionPair>
404 <SubstitutionPair expression="(DEVICE=\s*)(.+)">(Device)$2(\\Device)</SubstitutionPair>
406 <SubstitutionPair expression="(IPADDR=\s*)(.+)">(IpAddress)$2(\\IpAddress)</SubstitutionPair>
408 <SubstitutionPair expression="(NETMASK=\s*)(.+)">(Netmask)$2(\\Netmask)</SubstitutionPair>
410 <SubstitutionPair expression="(GATEWAY=\s*)(.+)">(Gateway)$2(\\Gateway)</SubstitutionPair>
412 <SubstitutionPair removeExpression="([\-a-zA-Z0-9=.])+([\n])"></SubstitutionPair>
</RegularExpressionTransforms>
```

Fig. 4

```xml
<xsl:transform version="1.0" xmlns:xsl="http://www.w3.org/1999/XSL/Transform">
<xsl:output method="html" indent="no" omit-xml-declaration="yes" />
<xsl:template match="ApplianceCurrent">
  <xsl:apply-templates/>
</xsl:template>

<xsl:template match="ApplianceCurrent">
  <xsl:text> #The following parameters are used to setup network connections.
</xsl:text>
  <xsl:for-each select="xpath">
    <xsl:choose>
      <xsl:when test="@name='/ApplianceRoot/Appliance/NetworkAdapters/Subnets/Gateway'">
        <xsl:text> GATEWAY=</xsl:text> <xsl:value-of select="."/> <xsl:text>
</xsl:text>
      </xsl:when>
      <xsl:when test="@name='/ApplianceRoot/Appliance/NetworkAdapters/Subnets/Type'">
        <xsl:text> TYPE=</xsl:text> <xsl:value-of select="."/> <xsl:text>
</xsl:text>
      </xsl:when>
      <xsl:when test="@name='/ApplianceRoot/Appliance/NetworkAdapters/Subnets/Device'">
        <xsl:text> DEVICE=</xsl:text> <xsl:value-of select="."/> <xsl:text>
</xsl:text>
      </xsl:when>
      <xsl:when test="@name='/ApplianceRoot/Appliance/NetworkAdapters/Subnets/Netmask'">
        <xsl:text> NETMASK=</xsl:text> <xsl:value-of select="."/> <xsl:text>
</xsl:text>
      </xsl:when>
      <xsl:when test="@name='/ApplianceRoot/Appliance/NetworkAdapters/Subnets/IpAddress'">
        <xsl:text> IPADDR=</xsl:text> <xsl:value-of select="."/> <xsl:text>
</xsl:text>
      </xsl:when>
    </xsl:choose>
  </xsl:for-each>
</xsl:template>
</xsl:transform>
```

*Fig. 5*

```xml
<?xml version="1.0" encoding="ISO-8859-1"?>
<ApplianceConfiguration>
    <ApplianceDocument>
        <serviceFile>com.novell.appliance.ApplianceGadget/model/services.xml</serviceFile>
        <responderFile>com.novell.appliance.ApplianceGadget/model/responders.xml</responderFile>
    </ApplianceDocument>
    <ApplianceGadget>
        <parameter gadget='com.novell.appliance.ApplianceGadget'>/ApplianceRoot</parameter>
        <parameter gadget='com.novell.boma2.IpAddress'>/ApplianceRoot/Appliance</parameter>
    </ApplianceGadget>
    <ApplianceShell>
        <parameter cmd='get address'>/ApplianceRoot/Appliance/NetworkAdapters/Subnets/IpAddress</parameter>
        <parameter cmd='get mask'>/ApplianceRoot/Appliance/NetworkAdapters/Subnets/Netmask</parameter>
        <parameter cmd='get defaultgateway'>/ApplianceRoot/Appliance/NetworkAdapters/Subnets/Gateway</parameter>
        <parameter cmd='get time'>/ApplianceRoot/Appliance/DateAndTime/Time</parameter>
        <parameter cmd='get timezone'>/ApplianceRoot/Appliance/DateAndTime/CurrentTimeZone</parameter>
        <parameter cmd='get date2'>/ApplianceRoot/Appliance/DateAndTime2/Date</parameter>
        <parameter cmd='get date'>/ApplianceRoot/Appliance/DateAndTime/Date</parameter>
        <parameter cmd='get files'>/ApplianceRoot/Appliance/Files</parameter>
        <parameter cmd='set address='>/ApplianceRoot/Appliance/NetworkAdapters/Subnets/IpAddress</parameter>
        <parameter cmd='set mask='>/ApplianceRoot/Appliance/NetworkAdapters/Subnets/Netmask</parameter>
        <parameter cmd='set defaultgateway='>/ApplianceRoot/Appliance/NetworkAdapters/Subnets/Gateway</parameter>
    </ApplianceShell>
</ApplianceConfiguration>
```

```
<?xml version="1.0" encoding="ISO-8859-1"?>
<!--This file configures responders that will act at each point in the Appliance Document construction-->
<ApplianceRoot>
    com.novell.appliance.responders.ElementResponder
    <Appliance>
        com.novell.appliance.responders.ElementResponder
        <NetworkAdapters> ~702
            com.novell.appliance.responders.ElementResponder
            <!--
                <Subnets xslFile='com.novell.appliance.ApplianceGadget/model/tranforms/ipaddress.xsl' ~710
configFile='/etc/sysconfig/network-scripts/ifcfg-eth0'
rexFile='com.novell.appliance.ApplianceGadget/model/transforms/ipaddress.rex' ~712
service='/Services/Linux/IpAddresses'> ~714
                com.novell.appliance.responders.XResponder
            </Subnets>
            -->
            <Subnets service='/Services/Linux/IpAddresses'>
                <parameter xslFile='com.novell.appliance.ApplianceGadget/model/transforms/ipaddress.xsl'
configFile='/etc/sysconfig/network-scripts/ifcfg-eth0' rexFile='com.novell.appliance.
ApplianceGadget/model/transforms/ipaddress.rex'/>
                <parameter xslFile='com.novell.appliance.ApplianceGadget/model/transforms/network.xsl'
configFile='/etc/sysconfig/network' rexFile='com.novell.appliance.
ApplianceGadget/model/transforms/network.rex' mode='writeonly'/>
                <parameter xslFile='com.novell.appliance.ApplianceGadget/model/transforms/tomcat.xsl'
configFile='/home/ksondere/jakarta-tomcat/webapps/nps/WEB-INF/PortalServlet.properties'
rexFile='com.novell.appliance.ApplianceGadget/model/transforms/tomcat.rex' mode='writeonly'/>
                com.novell.appliance.responders.MultiRegExElementResponder
            </Subnets>
        </NetworkAdapters>
        <DateAndTime> ~704
            com.novell.appliance.responders.TimeElementResponder      706
        </DateAndTime>
        <DateAndTime2 xslFile='com.novell.appliance.ApplianceGadget/model/transforms/date.xsl'
cmd='date' rexFile='com.novell.appliance.ApplianceGadget/model/transforms/date.rex' service=''>
            com.novell.appliance.responders.CmdElementResponder
        </DateAndTime2>
        <Files xslFile='com.novell.appliance.ApplianceGadget/model/transforms/date.xsl' cmd='ls/' ~708
rexFile='com.novell.appliance.ApplianceGadget/model/transforms/files.rex' ~716
service=''>com.novell.appliance.responders.CmdElementResponder ~718
        </Files>
    </Appliance>
</ApplianceRoot>
```

METHOD AND FRAMEWORK FOR USING XML FILES TO MODIFY NETWORK RESOURCE CONFIGURATIONS

BACKGROUND

This disclosure relates generally to computer software and, more specifically, to a system and method for script driven, web-based management of computer network resources.

A computer network connects devices that provide a variety of services to each other and to users. Each device is generally controlled by an operating system (which may be different on different devices) and associated with one or more of the services. In order for these services to be delivered, the devices and their services need to be configured. In networks that include a large number of devices or are spread over a large geographical area, the configuration of services is ideally accomplished remotely.

However, remotely configuring services presents a number of difficulties, particularly with respect to legacy services (e.g., services that are already in use). For example, on most operating systems, the services are configured through an ad hoc collection of utilities, registration settings, and files scattered throughout the associated operating system. This makes it difficult to modify a service's configuration. Furthermore, services may be interdependent. For instance, if an address (e.g., an internet protocol (IP) address) associated with a device is changed, each service that references that address may need to have its configuration files modified to reflect the change. Once the configuration files are modified, the services generally must be stopped and restarted in a specific order for the modifications to take effect.

Because of these and other difficulties, a relatively large amount of programming is generally needed to manage services in a uniform manner. Such programming increases the time and expense associated with configuring services and decreases the efficiency of remotely configuring services.

Therefore, what is needed is an improved method and system for remotely managing the configuration of network resources, including services.

SUMMARY

Provided is a method and system for web-management of resources. In one embodiment, a method for using a script driven framework to produce and use a transactional document is provided, where the transactional document provides an interface for modifying configuration information associated with a network resource. The method comprises registering the configuration information with the framework and creating the transactional document based on the configuration information. At least a portion of the configuration information is transformed from a native format into a framework format for use by the transactional document using a first predefined transformation file, and the portion is modified using the transactional document.

In another embodiment, a framework for use in configuring a network resource is provided. The framework comprises a first transformation file, a plurality of responders, a responders file, and a mapping configuration file. The first transformation file is for transforming configuration information associated with the network resource from a native format into a format compatible with the framework. The responders file is for assigning at least one of the plurality of responders to create a specified portion of the transactional document based on the configuration information. The mapping configuration file is for mapping between the transactional document and a user interface, where the configuration information can be modified through the transactional document via the user interface.

BRIEF DESCRIPTION OF THE DRAWINGS

FIG. 1A is a flowchart of an exemplary method for configuring network resources without extensive programming.

FIG. 2 is a diagram of an exemplary computer and network environment on which the framework of FIG. 1B may be implemented.

FIG. 3 is an exemplary appliance document that may be generated by the framework of FIG. 1B.

FIG. 4 is an exemplary regular expression file that may be used by the framework of FIG. 1B in creating the appliance document of FIG. 3.

FIG. 5 is an exemplary style sheet file that may be used by the framework of FIG. 1B in creating the appliance document of FIG. 3.

FIG. 6 is an exemplary XML configuration file that may be used to map between components of the framework of FIG. 1B.

FIG. 7 is an exemplary responders registry file that may be used by the framework of FIG. 1B in creating the appliance document of FIG. 3.

DETAILED DESCRIPTION

Figure 1B:
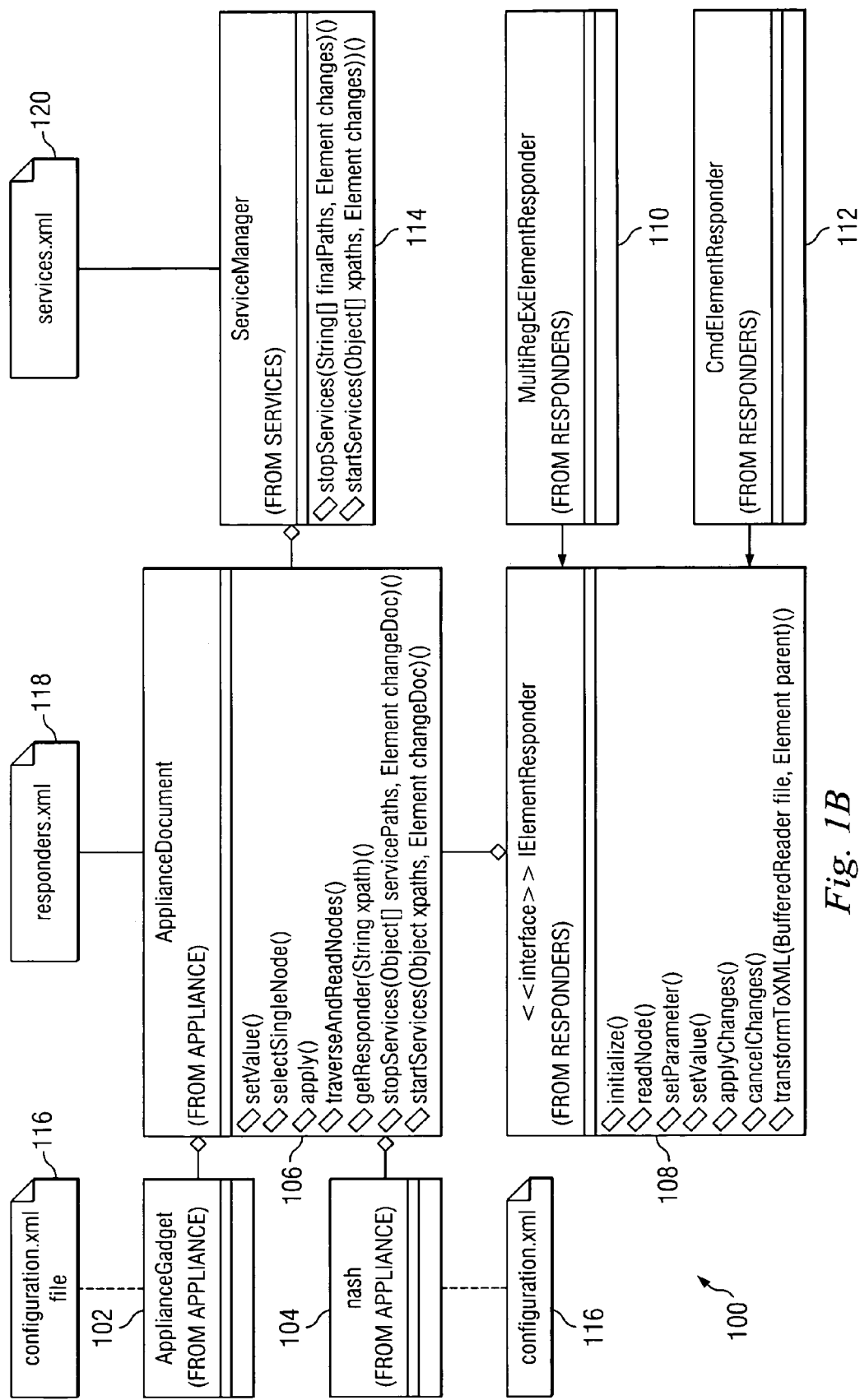
FIG. 1B is a diagram illustrating an exemplary class framework for enabling the method of FIG. 1A.

This disclosure relates generally to computer software and, more specifically, to a system and method for script driven, web-based management of computer network resources. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1A, in one embodiment, a method 10 enables a script driven approach for remotely managing and configuring network resources without requiring excessive programming. As will be described with specific examples in FIGS. 1B-11, the method 10 begins in step 12 by registering configuration information with a framework (FIG. 1B). The registration information is associated with a network resource and may include various configuration files, registry settings, and similar information. In step 14, a transactional document is created using the registered information. In step 16, configuration information may be transformed into the framework's format to enable the transactional document to read the information. The transformation is accomplished using a predefined transformation file that defines how the configuration information is to be converted from the configuration information's native format to the framework's format.

In step 18, modifications may be made to the configuration information via the transactional document. In step 20, services that are associated with the modified configuration information are automatically shut down. In step 22, the modifications may be transformed into the configuration information's native format. As with the transformation of step 18, the transformation is accomplished using another predefined transformation file that defines how the modifications are to be converted from the framework's format to the configuration information's native format. In step 24, the transformed modifications are written to the appropriate configuration files, registry settings, etc., and, in step 26, the services that were shut down in step 20 are automatically restarted.

Referring now to FIG. 1B, in another embodiment, a framework 100 provides various classes and class relationships that enable a script driven approach for remotely managing and configuring network resources, such as that used in the method 10 of FIG. 1A. In the present example, the resource is part of an appliance, which is a set of well defined services on a single network device that can be web managed. As will be described later in greater detail, the framework's classes create an appliance document (not shown) that provides a model interface to the appliance. The appliance document is a transactional extensible markup language (XML) document that is created by the classes based on a regular expression file, an extensible stylesheet language (XSL) file, and various configuration files that may be converted into XML format for use during the creation of the appliance document.

The classes in the framework 100 include an ApplianceGadget class 102, a nash class 104, an ApplianceDocument class 106, an IElementResponder class 108, a MultiRegExElementResponder class 110, a CmdElementResponder class 112, and a ServiceManager class 114. Various XML files may be used to control the behavior of the classes 102-114, such as an XML configuration file 116 (e.g., a mapping configuration file), a responders registry file 118, and a services registry file 120. The XML configuration file 116 is used by both the ApplianceGadget class 102 and the nash class 104. The responders registry file is used by the IElementResponder class 108 and the services registry file is used by the ServiceManager class 114. As described previously, a regular expression file and an XSL style sheet are also defined.

The ApplianceDocument class 106 uses the services of the IElementResponders class 108 to locate and modify resource settings from an adhoc collection of configuration files, utility commands, and direct application programming interface (API) calls. As it is understood that data output by the ApplianceDocument class 106 may be used in real time, stored as a document, stored as data components of a transactional document, etc., the output is referred to hereinafter as an "appliance document" for purposes of clarity. The appliance document is composed using element responders as defined by the responders registry file 118. More specifically, the responders registry file 118 defines which element responders (e.g., the MultiRegExElementResponder class 110, the CmdElementResponder class 112, and other responder classes not shown in FIG. 1B) will "service" (e.g., provide and modify data) a particular element in the ApplianceDocument class 106.

The standard element responders transform data to and from configuration files as defined in the responder registry file 118. The responder registry file 118 specifies which configuration file a responder will transform and may designate different files for different operations. For example, the regular expression file may be specified for use by the responders when transforming a configuration file into XML format on read operations, while the XSL style sheet may be specified for use by the responders when transforming from XML back into the configuration file format for write operations.

The following four types of classes act as responders to help construct the appliance document. An ElementResponder (not shown) is a placeholder. It does not generate data except for creating a new element that corresponds to its registered xpath (e.g., an XSL component that is used to identify tagged XML elements and may serve a similar purpose as a file path in a file system).

The MultiRegExElementResponder 110 handles transformations. For a reading operation, this responder uses a regular expression file (FIG. 4) to transform a configuration file into an XML file. For a writing operation, it uses XSL style sheets (FIG. 5) to transform an XML file into a configuration file. The XSL style sheets, the regular expression file, and the XML configuration file 116 may be registered within the framework 100 to facilitate these transformations. In addition, a service xpath may be configured by this responder to indicate a context from which a services hierarchy of parent/child services may operate.

The CmdResponder 112 translates data from the appliance document into CLI commands. Parameters for the CmdResponder 112 that are registered in the responders registry file 118 are the same as for the MultRegExElementResponder 110, except that, rather than a configuration file, a command to execute is registered.

A Responder (not shown) or any inherited class transforms an XML file into a configuration file based on XSL style sheets. An XSL file and a regular expression file may be registered in the framework 100 through the responders registry file 118 to facilitate the transformation.

Through the responders registry file 118, concrete IElementResponders are registered to the framework 100. Also through this file, a link is created to the ServiceManager class 114. That is, when a particular element is changed, an xpath is provided by the responders registry file 118 into the services registry file 120 to tell the ServiceManager class 114 where to begin shutdown and restart of services. Services that are associated with configuration files or registry settings that are to be modified may need to be shut down in a predefined order and restarted for the modifications to take effect. The ServiceManager class 114 looks in the services registry file 120 to determine shutdown and restart order. Services are shut down beginning at the lowest level child service in the XML hierarchy and working up to the highest level parent, and are restarted in the opposite order.

The ApplianceGadget class 102 and the nash class 104 provide management interfaces for the appliance. More specifically, the ApplianceGadget class 102 consumes the ApplianceDocument class 106 to enable web management of the appliance, while the nash class 104 consumes the ApplianceDocument class 106 in order to provide command line interface (CLI) management.

Referring now to FIG. 2, an exemplary computer 200, such as may be used to implement the framework 100 of FIG. 1B, is illustrated. The computer 200 may include a central processing unit ("CPU") 202, a memory unit 204, an input/output ("I/O") device 206, and a network interface 208. The network interface may be, for example, one or more network interface cards. The components 202, 204, 206, and 208 are interconnected by a bus system 210. It is understood that the computer may be differently configured and that each of the listed components may actually represent several different components. For example, the CPU 202 may actually represent a multi-processor or a distributed processing system; the memory unit 204 may include different levels of cache memory, main memory, hard disks, and remote storage locations; and the I/O device 206 may include monitors, keyboards, and the like.

The computer 200 may be connected to a network 212. The network 212 may be, for example, a subnet of a local area network, a company wide intranet, and/or the Internet. The computer 200 may be identified on the network 212 by an address or a combination of addresses, such as a media control access (MAC) address associated with the network interface 208 and an internet protocol (IP) address. Because the computer 200 may be connected to the network 212, certain components may, at times, be shared with other network devices 214, 216. Therefore, a wide range of flexibility is anticipated in the configuration of the computer. Furthermore, it is understood that, in some implementations, the computer 200 may act as a server to other devices 214, 216. In the present example, at least a portion of the device 216 forms an appliance 218 that can be managed from the computer 200.

Referring again to FIG. 1B and with additional reference to FIGS. 3-8, in another embodiment, a more detailed description of various components of the framework 100 is provided with specific examples.

Referring specifically to FIG. 3, an exemplary appliance document 300, such as may be produced by the ApplianceDocument class 106 of FIG. 1B, is illustrated. In the present example, the appliance document 300 includes multiple elements, such as a NetworkAdapters element 302, a first DateAndTime element 304, a second DateAndTime element 306, and a Files element 308. Each element may contain one more sub-elements. For example, the NetworkAdaptors element 302 includes a Subnets element 310, which in turn includes a Gateway element 312, a Type element 314, a Device element 316, an IpAddress element 318, a Netmask element 320.

Referring now specifically to FIG. 4, an exemplary regular expression file 400 is illustrated. As stated previously, the regular expression file 400 defines how configuration files are to be transformed from a configuration file format to XML. The regular expression file 400 (named "ipaddress.rex") is in XML format. Each "expression" element is used to search a particular configuration file for a match (e.g., TYPE 402, DEVICE 404, IPADDR 406, NETMASK 408, GATEWAY 410). When a match is located, the matching value may be substituted (elements 402-410) or the value may be removed (element 412). This results in the elements 312-320 in the appliance document 300 (FIG. 3). For example, a configuration file may contain the following:

IPADDR=137.65.203.166

The regular expression file 400 will pull the value 137.65.203.166, which is symbolized in the file by $2, from the configuration file. Subsequently, in the appliance document 300 created using the regular expression file 400, the following IpAddress element 320 (FIG. 3) will be created under the NetworkAdapters element 302:

<IpAddress>137.65.203.166</IpAddress>

Referring now specifically to FIG. 5, an exemplary XSL stylesheet 500 is illustrated. As stated previously, the XSL stylesheet 500 (named "ipaddress.xsl") defines how a configuration file is to be transformed from the XML used by the framework 100 back into the file format used by the configuration file on the appliance 218.

Referring now specifically to FIG. 6, the exemplary XML configuration file 116 of FIG. 1B, under the ApplianceShell element 602, maps between CLI commands and xpaths in the appliance document 300 of FIG. 3. By specifying an xpath into the appliance document 300, the CLI implementation can locate and retrieve a specific value out at the xpath point in the appliance document 300. For example, the command "get address" 604 goes into the appliance document 300 and retrieves an IP address (e.g., the element 320) from the appliance document 300. This makes it possible to add CLI commands without recompiling by simply adding the command to the XML configuration file 116.

Referring now specifically to FIG. 7, the exemplary responders registry file 118 defines how the ApplianceDocument class 106 will use the services of the IElementResponder 108 to construct the appliance document 300 from an adhoc collection of configuration files, utility commands, or API calls. The element names in the responders registry file 118 correlate to the output of the ApplianceDocument class 106. For example, the responders registry file 118 includes a NetworkAdapters element 702, a first DateAndTime element 704, a second DateAndTime element 706, and a Files element 708, which correspond to the elements of the appliance document 300, such as the NetworkAdapters element 302, the first DateAndTime element 304, the second DateAndTime element 306, and the Files element 308.

As stated previously, the responders registry file 118 directs the creation of the appliance document 300 of FIG. 3 by defining which responders (e.g., the MultiRegExElementResponder, the CmdResponder, etc.) handle a specific element of the appliance document and which regular expression files they will use. For example, lines denoted by reference numbers 710, 712 of the responders registry file 118 specify that the regular expression file 400 of FIG. 4 (e.g., ipaddress.rex) and the XSL style sheet 500 of FIG. 5 (e.g., ipaddress.xsl), will be used for transforming files for the Subnets element 310 of the appliance document 300. As defined on the line denoted by the reference number 714, an XResponder will provide the services.

Similarly, lines denoted by reference numbers 708, 716 of the responders registry file 118 specify that a regular expression file named files.rex and an XSL style sheet named files.xsl will be used for transforming files for the Files element 308 of the appliance document 300. The services will be provided by the CmdResponder, as defined by the line denoted by the reference number 718. In the present example, an "ls/" command is provided, which is represented in the appliance document 300 by various commands in the Files element 308 of FIG. 3.

Figures 8, 9:
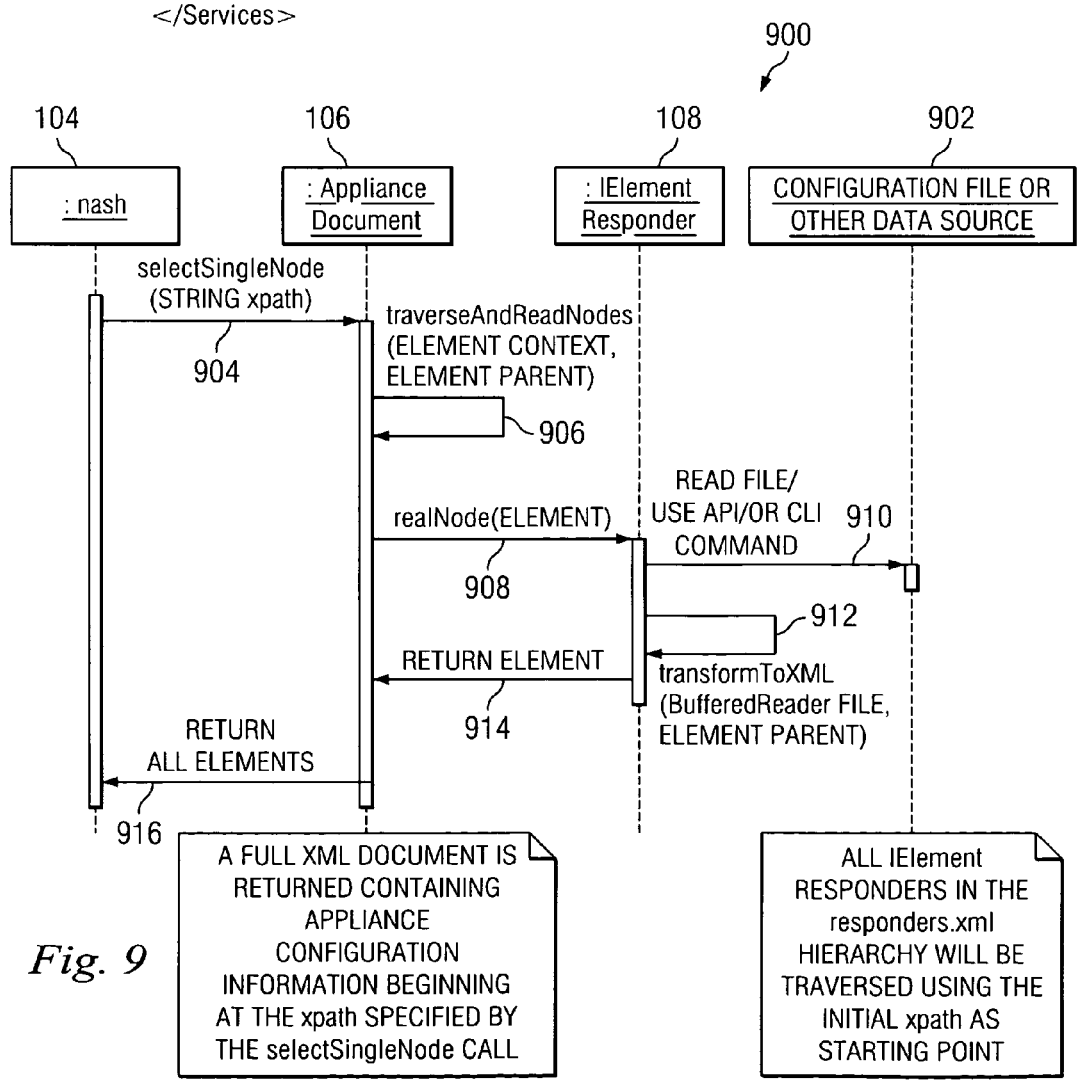
FIG. 8 is an exemplary services registry file that may be used by the framework of FIG. 1B to shut down and restart services so that modifications detailed by the appliance document of FIG. 3 may be applied within the network environment of FIG. 2.
FIG. 9 is a diagram illustrating a sequence that may be used to read configuration settings within the framework of FIG. 1B.

Referring now to FIG. 8, the services registry file 120 is used by the ServiceManager 114 to determine the shutdown and startup order of services. When an "apply" command is imposed on the ApplianceDocument class 106, all services relating to any configuration file changes are stopped in the order determined by the services registry file 120, starting from the lowest-level service and continuing to the highest-level service (e.g., child services get shutdown before parent services). Then, configuration changes are written into the corresponding configuration files. Finally, all stopped services are restarted in the order determined by the services registry file 120, starting from the highest-level service and continuing to the lowest-level service (e.g., parents are all started first and then children are started).

It is noted that the service registry file 120 enables more efficient "cycling" of services by enabling the service cycling hierarchy to be seen and modified by examining and changing the service registry file 120. Previously, modifications to cycling code frequently required program modifications, which increased the complexity of modifying the cycling hierarchy when appliance changes were made.

Referring now to FIG. 9, in another embodiment, a sequence 900 illustrates how configuration settings may be read from a configuration file or other data source using the framework of FIG. 1B and the operations associated with each class. The read operation uses classes described previously with respect to FIG. 1B, including the nash class 104 (which provides a CLI management interface to the ApplianceDocument class 106), the ApplianceDocument class 106, the IElementResponder class 108, and a data source 902 which, for purposes of example, is a configuration file.

The sequence 900 begins in step 904 when the nash class 104 calls a selectSingleNode (String xpath) operation from the ApplianceDocument class 106. In response, the ApplianceDocument class 106 executes a traverseAndReadNodes (Element context, Element parent) operation in step 906, and then calls a readNode(Element) operation associated with the IElementResponder class 108 in step 908. In step 910, the IElementResponder class 108 reads a file from the data source 902 using API or CLI commands.

In step 912, the IElementResponder class 108 utilizes a transformToXML(BufferedReader file, Element parent) operation to transform the read source 902 into an XML file. As discussed previously, a regular expression file and an XSL style sheet may be used to direct the transformations to and from XML. In step 914, the IElementResponder class 108 returns the transformed XML file to the ApplianceDocument class 106 and, in step 916, the ApplianceDocument class 106 returns the XML file containing the configuration information specified by the original selectSingleNode call.

Figure 10:
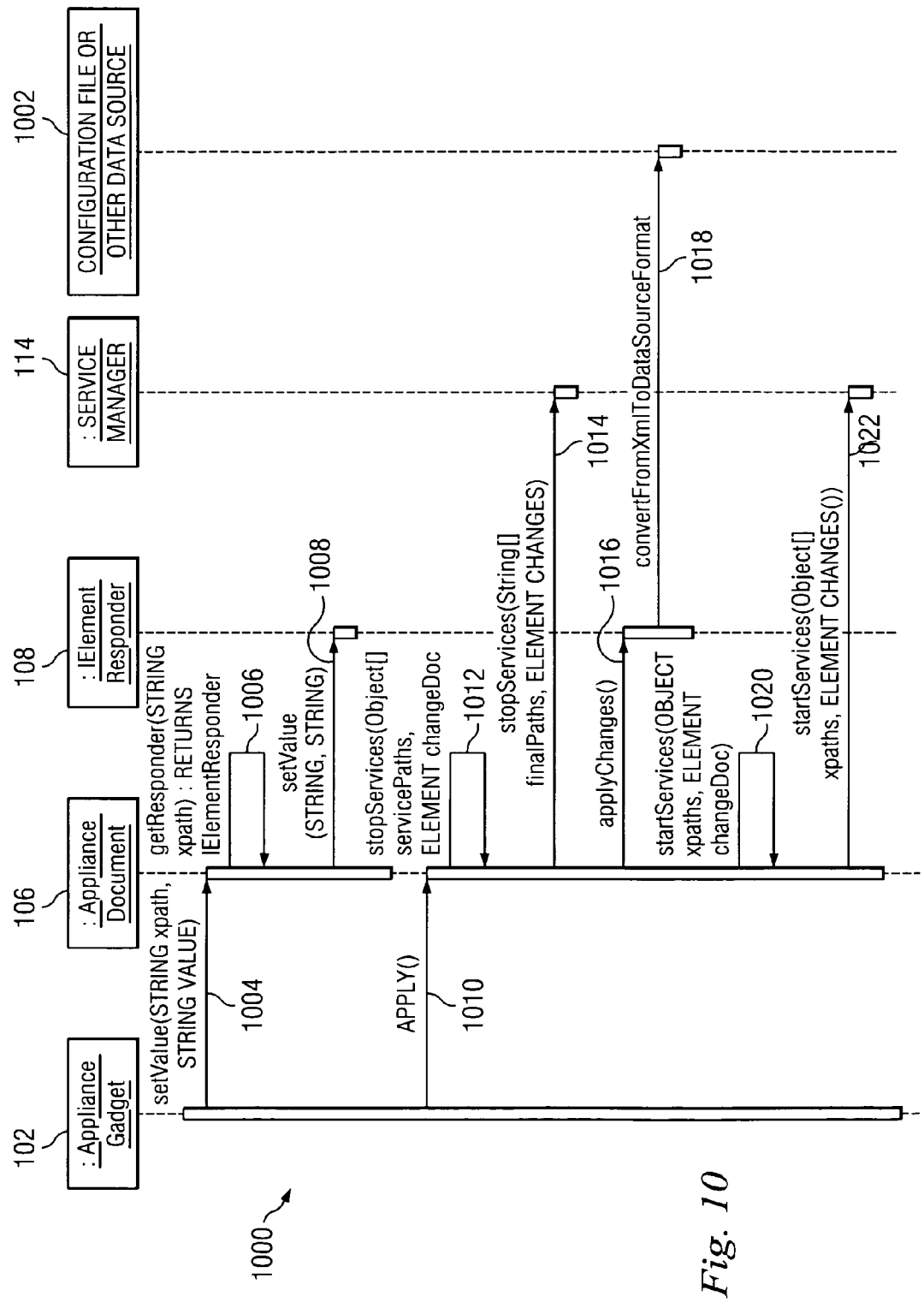
FIG. 10 is a diagram illustrating a sequence that may be used to write configuration settings within the framework of FIG. 1B.

Referring now to FIG. 10, in yet another embodiment, a sequence 1000 illustrates how configuration settings may be written to a configuration file or other data source using the framework of FIG. 1B and the operations associated with each class. The write operation uses classes described previously with respect to FIG. 1B, including the ApplianceGadget class 102 (which provides a web-based management interface to the ApplianceDocument class 106), the ApplianceDocument class 106, the IElementResponder class 108, the ServiceManager class 114, and a data source 1002, which, for purposes of example, is a configuration file.

The sequence 1000 begins in step 1004 when the ApplianceGadget class 102 calls a setValue(String xpath, String value) from the ApplianceDocument class 106. In step 1006, in response, the ApplianceDocument class 106 retrieves a responder by executing a getResponder(String xpath) operation, and then, in step 1008, sends a setValue(String, String) to the IElementResponder class 108. In step 1010, the ApplianceGadget class 102 executes an apply( ) operation of the ApplianceDocument class 106, which results in the ApplianceDocument class 106 calling a stopServices(Object[ ] servicePaths, Element changeDoc) function and sending a stopServices(String[ ] finalPaths, Element changes) to the ServiceManager class 114 in steps 1012, 1014, respectively.

In step 1016, the ApplianceDocument class 106 executes an applyChanges( ) operation associated with the IElementResponder class 108. In response, the IElementResponder class 108 converts modifications from XML format to a configuration file format and applies the modifications to the data source 1002 in step 1018.

In step 1020, the ApplianceDocument class 106 executes a startServices(Object[ ] xpaths, Element changeDoc) operation and, in step 1022, sends a startServices(Object[ ] xpaths, Element changes( )) message to the ServiceManager class 114 to restart the newly modified services.

Figure 11:
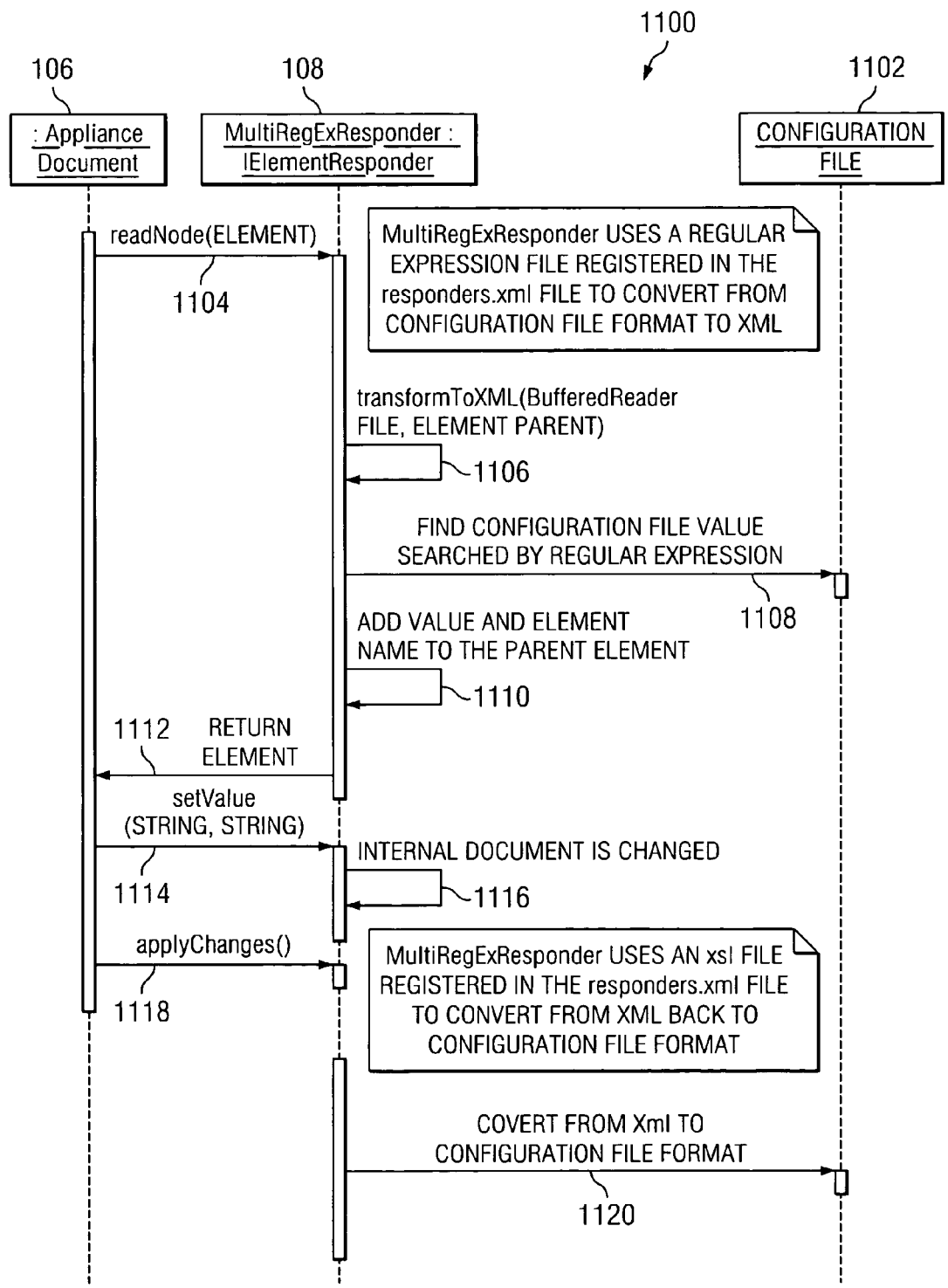
FIG. 11 is a diagram illustrating a configuration file modification sequence that may be performed using an exemplary responder class within the framework of FIG. 1B.

Referring now to FIG. 11, in still another embodiment, a sequence 1100 illustrates how a conversion to and from an XML file may be achieved using a MultiRegExResponder class 110 within the framework 100 of FIG. 1B. The transformations use classes described previously with respect to FIG. 1B, including the ApplianceDocument class 106, the MultiRegExResponder class 110, and a data source 1102, which, for purposes of example, is a configuration file.

In step 1104, during the reading portion of the sequence 1100, the MultiRegExResponder class 110 receives an instruction from the ApplianceDocument class 108 to execute a readNode(element) operation. In step 1106, the MultiRegExResponder class 110 executes a transformToXML (BufferedReader file, Element parent) operation, which uses a regular expression file registered in the responders registry file 118 to convert a configuration file into an XML file. In step 1108, the MultiRegExResponder class 110 locates a configuration file value searched by regular expression (e.g., the IPADDR element 406 of the regular expression file 400 of FIG. 4) and, in step 1110, adds the located value and element name to the element identified in the readNode operation of step 1104. The element is then returned to the ApplianceDocument class 108 in step 1112.

A modified value for the returned element is supplied to the MultiRegExResponder class 110 using a setValue(String, String) operation in step 1114 and the modification is applied by the MultiRegExResponder class 110 in step 1116. In response to an applyChanges( ) instruction issued by the ApplianceDocument class 106 in step 1118, the MultiRegExResponder class 110 uses XSL style sheets registered in the responders registry file 118 to convert the modified XML file into the format of the original configuration file in step 1120 and then store the configuration file.

While the invention has been particularly shown and described with reference to a few exemplary embodiments thereof, it will be understood by those skilled in the art that various changes in form and detail may be made therein without departing from the spirit and scope of the invention. For example, while the framework 100 is illustrated using primarily XML files and XSL style sheets, it is understood that other formats may be substituted. Furthermore, while the examples focus on the configuration of services, it is understood that the present disclosure may be used when configuring devices. In addition, steps may be performed in a different order than described, some steps may be incorporated into other steps, and some steps may be omitted entirely. Also, while terms such as "predefined" may be used with respect to certain files or actions for purposes of example, it is understood that files and actions may be created, configured, or manipulated dynamically. Therefore, the claims should be interpreted in a broad manner, consistent with the present invention.

What is claimed is:

1. A method for using a script driven framework to produce and use a transactional document, wherein the transactional document provides an interface for modifying configuration information associated with a network resource, the method comprising:

registering the configuration information with the framework;

creating the transactional document based on the configuration information;

transforming at least a portion of the configuration information for use by the transactional documents, wherein the portion is transformed from a native format into a framework format using a first predefined transformation file; and modifying the portion using the transactional document.

2. The method of claim 1 further comprising storing the modified portion, wherein the network resource will be configured as defined in the modified portion.

3. The method of claim 2 further comprising transforming the modified portion from the framework format to the native format using a second predefined transformation file before storing the modified portion.

4. The method of claim 2 further comprising:
automatically shutting down services associated with the modified portion prior to storing the modified portion; and
automatically restarting the services after storing the modified portion.

5. The method of claim 4 further comprising defining a service hierarchy, wherein the service hierarchy defines an order in which the services are shut down and restarted.

6. The method of claim 1 wherein creating the transactional document includes using a plurality of responders to create different portions of the transactional document.

7. The method of claim 6 further comprising specifying through a responders registry which of the plurality of responders will be used to create the different portions of the transactional document.

8. The method of claim 6 wherein at least one of the plurality of responders is specified for transforming the portion of the configuration information using the first predefined transformation file.

9. The method of claim 1 wherein modifying the portion using the transactional document includes:
entering data for modifying the portion; and
mapping between the entered data and the transactional document via a mapping configuration file.

10. The method of claim 1 further comprising identifying a utility needed by the framework to modify the configuration information, wherein registering the configuration information includes registering the utility.

11. A computer readable medium comprising a plurality of instructions for execution by at least one computer processor, wherein the instructions are for:

transforming configuration information associated with a network resource from a first format into a second format using at least one transformation file;
using a responders registry to direct a plurality of responders to create a transactional document in the second format based on the configuration information, wherein the responder registry defines which of the plurality of responders creates each portion of the transactional document;
modifying the configuration information via the transactional document;
transforming the modified configuration information from the second format into the first format using the at least one transformation file; and
storing the modified configuration information, wherein the network resource can be configured through modifications made to the transactional document.

12. The computer readable medium of claim 11 further comprising instructions for enabling a user to define the at least one transformation file.

13. The computer readable medium of claim 11 further comprising instructions for enabling a user to modify the configuration information using a command line interface ("CLI") command.

14. The computer readable medium of claim 13 further comprising instructions for providing an interface configuration file for mapping between the CLI command and the transactional document.

15. The computer readable medium of claim 11 further comprising instructions for defining a service hierarchy file, wherein the service hierarchy file identifies a hierarchy of services associated with the network resource.

16. The computer readable medium of claim 15 further comprising instructions for shutting down and restarting services associated with the network resource, wherein the shutting down and restarting is accomplished in an order define by the service hierarchy file.

* * * * *